United States Patent
Simske (10) Patent No.: US 7,106,905 B2
(45) Date of Patent: Sep. 12, 2006

(54) SYSTEMS AND METHODS FOR PROCESSING TEXT-BASED ELECTRONIC DOCUMENTS

(75) Inventor: Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 755 days.

(21) Appl. No.: 10/227,076

(22) Filed: Aug. 23, 2002

(65) Prior Publication Data
US 2004/0037470 A1 Feb. 26, 2004

(51) Int. Cl.
G06K 9/72 (2006.01)

(52) U.S. Cl. .................. 382/229; 382/177; 382/181; 707/5; 707/101

(58) Field of Classification Search ................ 382/177, 382/181, 174, 176, 229, 310, 203, 289, 209, 382/218; 707/2, 3, 5, 6, 101
See application file for complete search history.

(56) References Cited

U.S. PATENT DOCUMENTS

| | | | |
|---|---|---|---|
| 3,969,700 A | 7/1976 | Bollinger et al. | |
| 4,701,851 A | 10/1987 | Bass et al. | |
| 5,161,245 A | 11/1992 | Fenwick | |
| 5,225,981 A * | 7/1993 | Yokogawa | 704/2 |
| 5,325,444 A * | 6/1994 | Cass et al. | 382/177 |
| 5,539,841 A * | 7/1996 | Huttenlocher et al. | 382/218 |
| 5,764,799 A * | 6/1998 | Hong et al. | 382/225 |
| 6,038,527 A * | 3/2000 | Renz | 704/9 |
| 6,145,579 A | 11/2000 | Goldberg | |
| 6,212,299 B1 * | 4/2001 | Yuge | 382/231 |
| 6,219,453 B1 * | 4/2001 | Goldberg | 382/229 |
| 6,363,179 B1 * | 3/2002 | Evans et al. | 382/309 |

FOREIGN PATENT DOCUMENTS

EP 0878766A2 11/1998

* cited by examiner

Primary Examiner—Sheela Chawan (57) ABSTRACT

Systems and methods for processing text-based electronic documents are provided. Briefly described, one embodiment of a method for processing a text-based electronic document comprises the steps of: comparing at least one word in a text-based electronic document to a native language dictionary to determine whether the at least one word conforms to a predefined rule; for each of the at least one word that does not conform to the predefined rule, fragmenting the at least one word into word fragments; combining at least two consecutive word fragments; and comparing the combination of the word fragments to the native language dictionary.

25 Claims, 6 Drawing Sheets

SYSTEMS AND METHODS FOR PROCESSING TEXT-BASED ELECTRONIC DOCUMENTS

TECHNICAL FIELD

The present invention is generally related to document processing and, more particularly, to systems and methods for processing text-based electronic documents.

BACKGROUND OF THE INVENTION

Optical character recognition (OCR) systems are typically used to capture text from a document (e.g., a machine-printed document, handwritten document, etc.) by optically scanning the document and creating a two-dimensional digital representation of the document (e.g., a pixel representation, a bit-map, etc.). Most OCR systems are configured to convert the two-dimensional digital representation into a series of characters that may be manipulated by a computer. For example, OCR systems typically convert the text portions into code, such as code formatted according to the American Standard Code for Information Interchange (ASCII) or the Unicode standard, by performing any of a variety of character recognition processes on the two-dimensional digital representation. Many OCR systems are configured to provide the character-encoded representation in a form compatible with common software applications, such as word processing, etc. OCR systems perform a variety of heuristic and template-driven tasks on the two-dimensional digital representation to produce the character-encoded representation, which may be imported into another software application to be displayed, printed, and/or modified.

The accuracy of the output of current OCR systems, however, may be very limited. For example, because of the similarity between individual symbols, characters, and/or other annotations, as well as combinations of characters (glyphs), current OCR systems may be unable to eliminate errors that occur in the process of recognizing characters in the two-dimensional digital representation of the document. Typically, OCR systems have a tendency to produce glyph (one or more characters) mistakes, substitutions, insertions, deletions, etc. In addition, the output of current OCR systems is highly-dependent on the quality of the original document and the quality of the two-dimensional digital representation that has been scanned.

Furthermore, in order to reduce character recognition errors, current OCR systems may have to implement more complex character recognition techniques. Complex character recognition techniques, however, are more expensive and require more processing time. For instance, a current OCR system may implement a very complex character recognition technique that is designed to produce a very accurate output. However, these systems may be problematic where large amounts of text are being converted because of the increased processing time required.

SUMMARY OF THE INVENTION

The present invention provides systems and methods for processing text-based electronic documents.

Briefly described, one embodiment of a method for processing a text-based electronic document comprises the steps of: comparing at least one word in a text-based electronic document to a native language dictionary to determine whether the at least one word conforms to a predefined rule; for each of the at least one word that does not conform to the predefined rule, fragmenting the at least one word into word fragments; combining at least two consecutive word fragments; and comparing the combination of the word fragments to the native language dictionary.

Another embodiment comprises a system for processing a text-based electronic document. Briefly described, one embodiment of such a system comprises logic configured to compare at least one word in a text-based electronic document to a native language dictionary to determine whether the at least one word conforms to a predefined rule, fragment each of the at least one word that does not conform to the predefined rule into word fragments, combine at least two consecutive word fragments, and compare the combination of the word fragments to the native language dictionary.

Another embodiment of such a system comprises: a means for comparing at least one word in a text-based electronic document to a native language dictionary to determine whether the at least one word conforms to a predefined rule; a word fragmentation means for fragmenting each of the at least one word that does not conform to the predefined rule into word fragments; a word fragment integration means for combining at least two consecutive word fragments; and a means for comparing the combination of the word fragments to the native language dictionary.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As stated above, the present invention provides systems and methods for processing text-based electronic documents (e.g., documents processed by an optical character recognition system (OCR), text files, word processing files, hypertext markup (HTML) files, other computer-readable text files, etc.). It will be appreciated by those of ordinary skill in the art with reference to this document that, depending on the particular type of text-based electronic document being processed, the present invention may be implemented in a variety of environments. For example, in one of a number of possible embodiments, the systems and methods according to the present invention may be used to process a document scanned by an OCR system. In this manner, the present invention may improve the accuracy with which text in the scanned document is converted into computer-readable form. Although the systems and methods according to the present invention may be used to process a variety of alternative text-based electronic documents, the remainder of this document will discuss a specific implementation within an OCR system.

Figure 1:
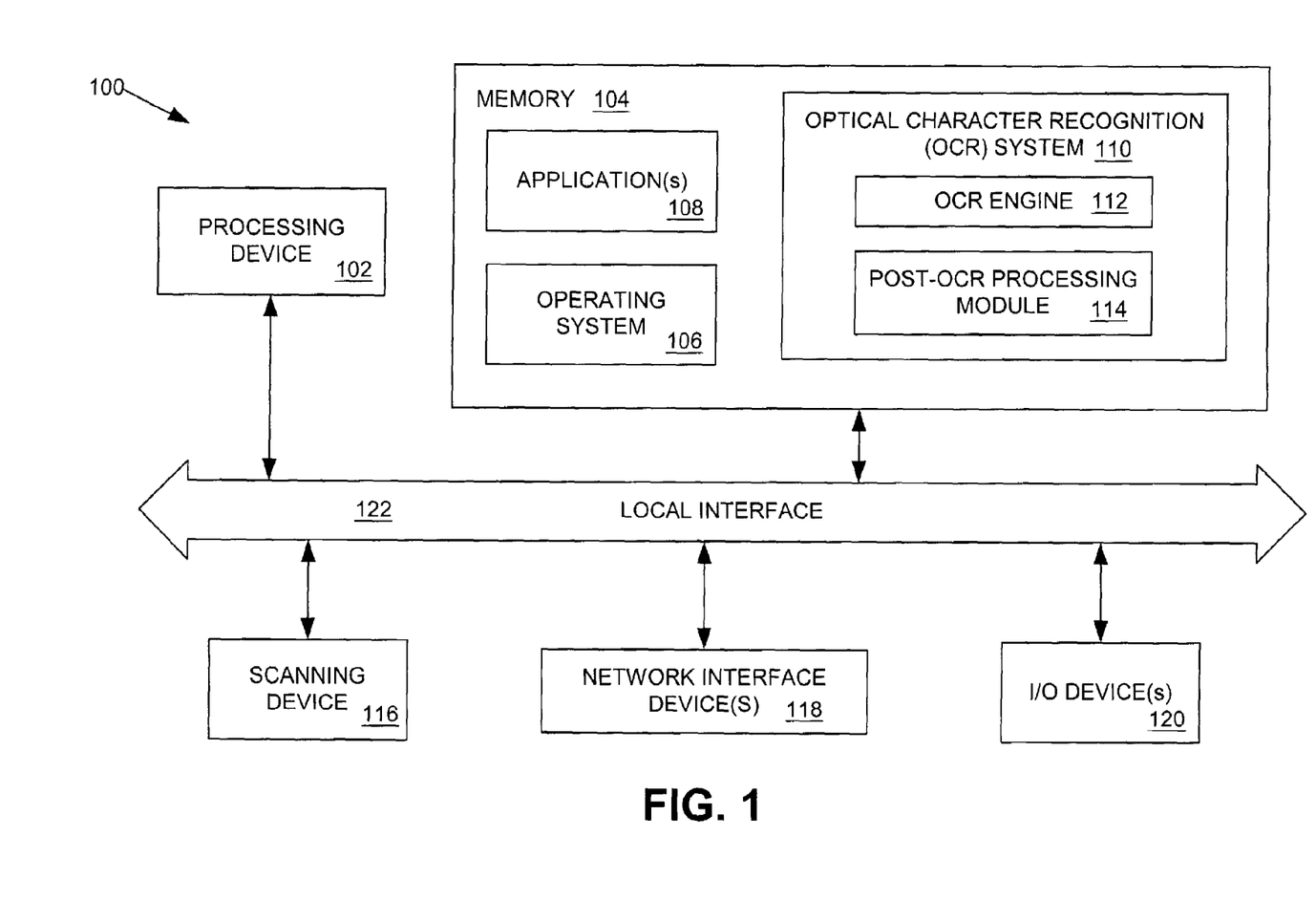
FIG. 1 is a block diagram of an embodiment of a system according to the present invention for improving the accuracy of an optical character recognition (OCR) system.

FIG. 1 is a block diagram of a system 100 in which an embodiment of an optical character recognition (OCR) system 110 according to the present invention may be implemented. As described in more detail below, optical character recognition system 110 improves the accuracy with which text in a document, which has been captured as a document image or bitmap (e.g., a digital mapping of pixels) by optically scanning the document, is converted into a computer-readable form.

Optical character recognition system 110 may be implemented in software, firmware, hardware, or a combination thereof. In the embodiment illustrated in FIG. 1, optical character recognition system 110 is implemented in software, as an executable program, which is executed by a processing device 102. Generally, in terms of hardware architecture, as shown in FIG. 1, system 100 comprises a processing device 102, memory 104, a scanning device 116, one or more network interface devices 118, and one or more input and/or output (I/O) devices 120 interconnected via a local interface 122. System 100 may further comprise additional components not illustrated in FIG. 1.

Local interface 122 may be, for example but not limited to, one or more buses or other wired or wireless connections. The local interface 122 may have additional elements, which are omitted for simplicity, such as controllers, buffers (caches), drivers, repeaters, and receivers, to enable communications. Furthermore, the local interface 122 may include address, control, and/or data connections to enable appropriate communications among the aforementioned components.

Processing device 102 is a hardware device for executing software, particularly that stored in memory 104. Processing device 102 may be any custom-made or commercially-available processor, a central processing unit (CPU), an auxiliary processor among several processors associated with system 100, a semiconductor-based microprocessor (in the form of a microchip or chip set), a macroprocessor, or generally any device for executing software instructions.

As illustrated in FIG. 1, memory 104 comprises an operating system 106, at least one application 108, and optical character recognition system 110. Optical character recognition system 110 further comprises at least one OCR engine 112 and at least one post-OCR processing module 114. Memory 104 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Memory 104 may incorporate electronic, magnetic, optical, and/or other types of storage media. Furthermore, memory 104 may have a distributed architecture, in which various components are situated remote from one another, but can be accessed by processing device 102.

The software in memory 104 may include one or more separate programs, each of which comprises executable instructions for implementing logical functions. In the example of FIG. 1, the software in memory 104 includes optical character recognition system 110 according to the present invention. Memory 104 may further comprise a suitable operating system 106 that controls the execution of other computer programs, such as one or more applications 108 and optical character recognition system 110, and provides scheduling, input-output control, file and data management, memory management, and communication control and related services.

Optical character recognition system 110 may be a source program, executable program (object code), script, or any other entity comprising a set of instructions to be performed. When implemented as a source program, then the program is translated via a compiler, assembler, interpreter, or the like, which may or may not be included within the memory 104, so as to properly operate in connection with operating system 106.

Scanning device 116 may be any device configured to convert a document 202, such as a paper document, into an electronic representation of the document. For example, scanning device 116 may be configured to optically capture text, illustrations, etc. printed on paper and translate the information into a computer-readable form. In other words, scanning device 116 digitizes the document 202 by dividing it into a grid of boxes and representing each box with either a zero or a one, depending on whether the box is filled in. For color and gray scaling, the same principle applies, but each box is then represented by more than one bit. The resulting matrix of bits, referred to as a bit map, may then be stored in memory 104 and processed by OCR engine 112 as described below.

One of ordinary skill in the art will appreciate that a variety of scanning devices 116 may be employed. For example, a sheet-fed scanner may be implemented, in which mechanical rollers move the document to be scanned past a scan head. In other embodiments, a flatbed scanner may be implemented, in which the document to be scanned is stationary, for example, behind a glass window, while the scan head moves past the document. Scanning device 116 may also be a handheld scanner in which the scan head is manually moved across the document to be scanned.

Network interface device(s) 118 may be any device configured to facilitate communication between system 100 and a communication network, such as a public or private packet-switched or other data network including the Internet, a circuit-switched network, such as the public-switched telephone network, a wireless network, an optical network, or any other desired communications infrastructure.

Input/output devices 120 may comprise any device configured to communicate with local interface 118. One of ordinary skill in the art will appreciate that, depending on the configuration of system 100, input/output devices 120 may include any of the following, or other, devices: a keyboard, a mouse, display device, such a computer monitor, a serial port, a parallel port, a printer, speakers, a microphone, etc.

During operation of system 100, the processing device 102 is configured to execute logic stored within the memory 104, to communicate data to and from the memory 104, and to generally control operations of the system 100 pursuant to the software. Optical character recognition system 110 and operating system 106, in whole or in part, but typically the latter, are read by the processing device 102, perhaps buffered within the processing device 102, and then executed.

In embodiments where optical character recognition system 110 is implemented in software, as is shown in FIG. 1, optical character recognition system 110 may be stored on any computer-readable medium for use by or in connection with any computer-related system or method. In the context of this document, a computer-readable medium may be an electronic, magnetic, optical, or other physical device or means that may contain or store a computer program for use by or in connection with a computer related system or method. Optical character recognition system 110 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of a computer-readable medium would include: an electrical connection, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, suitably processed and stored in a computer memory.

In alternative embodiments where optical character recognition system 110 is implemented in hardware, optical character recognition system 110 may be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc., or other technologies now known or later developed.

As stated above, optical character recognition system 110 comprises at least one OCR engine 112 and at least one post-OCR processing module 114. In general, optical character recognition system 110 improves the character recognition accuracy of the overall system by processing the output of OCR engine 112 via post-OCR processing module 114.

Figure 2:
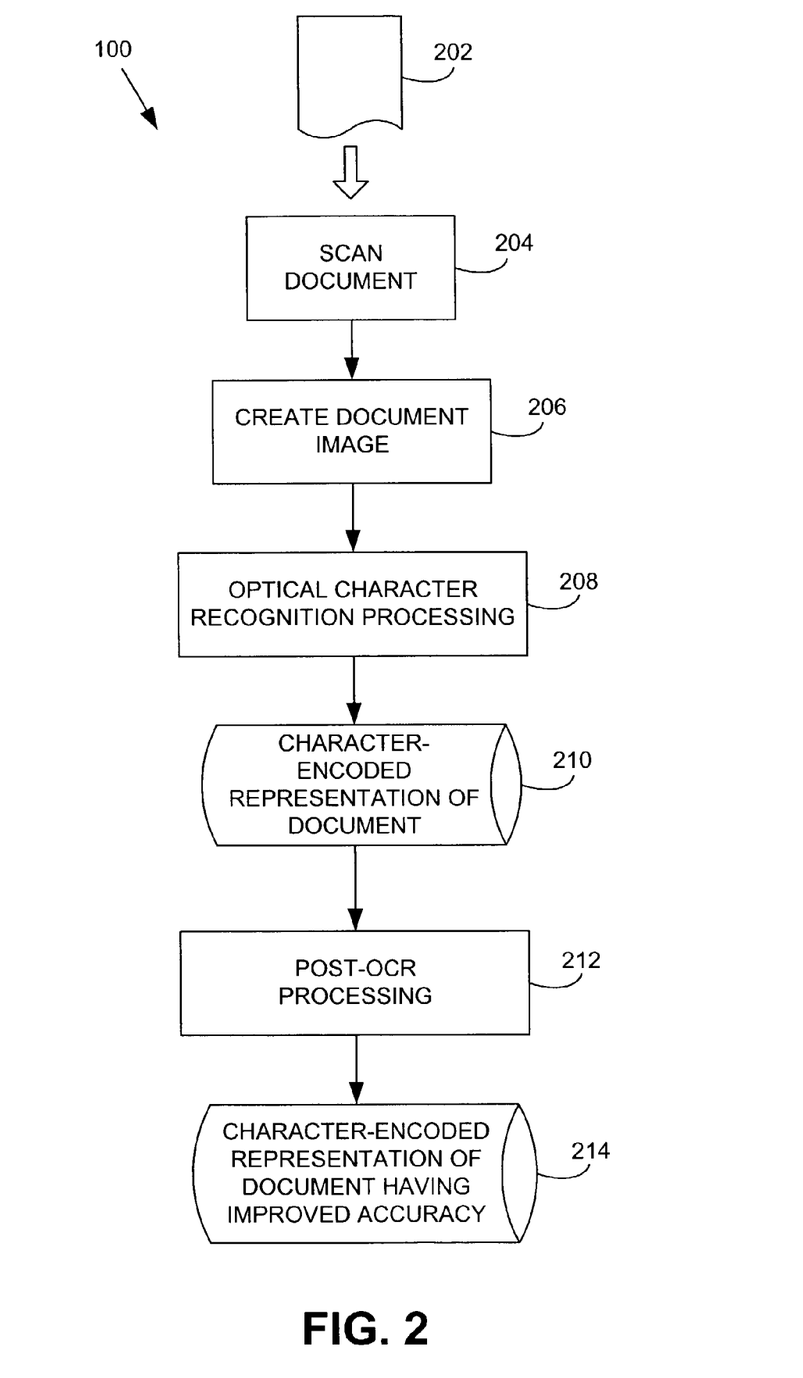
FIG. 2 is a flow chart illustrating the general operation of the system of FIG. 1.

Referring to FIG. 2, the general operation of system 100 will be described. As illustrated by blocks 204 and 206, OCR system 100 captures text from a document 202 by optically scanning the document and creating a document image. At block 208, OCR system 100 converts text within the document image into a character-encoded representation 210, for example, a computer-readable form (e.g., ASCII code (American Standard Code for Information Interchange) or Unicode) by performing any of a variety of character recognition processes. After the text in the document image is translated into a computer-readable form by the OCR processes, at block 212, OCR system 100 may perform a variety of post-OCR processes in order to provide a character-encoded representation 214 having improved character recognition accuracy.

Figure 3:
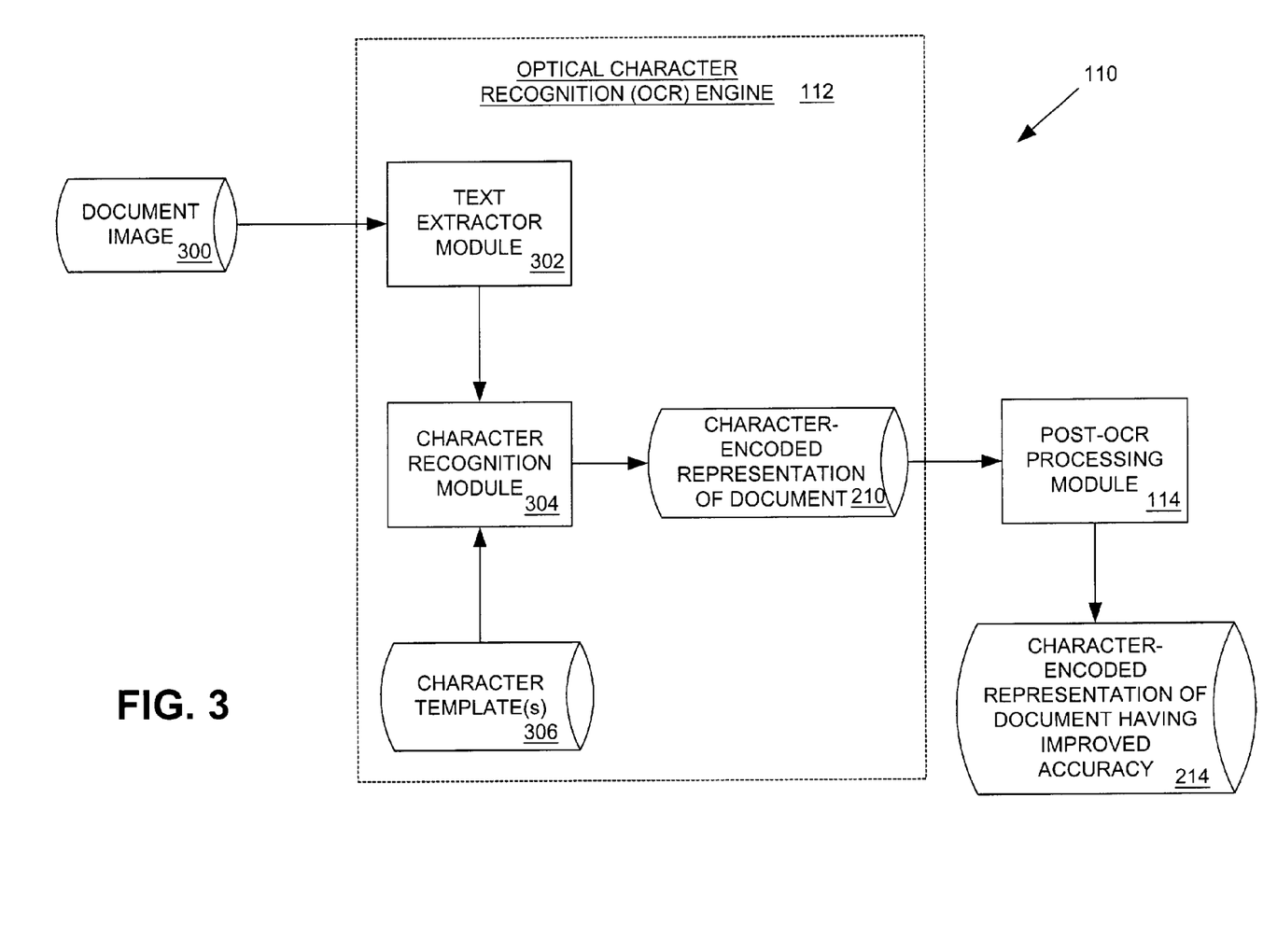
FIG. 3 is a flow chart illustrating the functionality, architecture, and/or operation of an embodiment of the optical character recognition engine of the system of FIG. 1.

As illustrated in FIG. 3, OCR engine 112 may comprise a variety of logical modules for converting a document image 300 (e.g., an electronic representation of a document that has been scanned) into a character-encoded representation 210 of the document in a computer-readable form. Character-encoded representation 210 may be in a variety of forms, such as ASCII code or Unicode. For example, in order to perform this translation, OCR engine 112 may comprise a text extractor module 302, a character recognition module 304, and at least one character template 306. Text extractor module 302 may be configured to receive document image 300 and distinguish text portions from non-text portions, such as images. Character recognition module 304 may be configured to process the text portions of the document image 300 and identify the words, letters, numbers, spaces, punctuation, diacritical marks, etc. to generate character-encoded representation 210. For example, character recognition module 304 may perform a variety of heuristic and template-driven tasks on the two-dimensional digital representation of the document via comparison to at least one character template 306. One of ordinary skill in the art will appreciate that character recognition module 304 may implement any of a variety of known or later developed character recognition techniques. Regardless of the character recognition technique employed, OCR engine 112 generates character-encoded representation 210, which may be in any computer-readable form. As described in more detail below, post-OCR processing module 114 receives the character-encoded representation 210 from OCR engine 112, processes the character-encoded representation 210, and generates a semantic representation 212 having improved accuracy.

As stated above, post-OCR processing module 114 may be used to improve the performance of OCR engine 112 by processing the character-encoded representation 210 generated by the OCR engine 112. In general, post-OCR processing module 114 processes the character-encoded representation 210 according to statistical information related to recognition errors made by OCR engine 112 and a native language dictionary, as well as by an iterative process of fragmenting words in the character-encoded representation 210 and combining the resulting word fragments.

Figure 4:
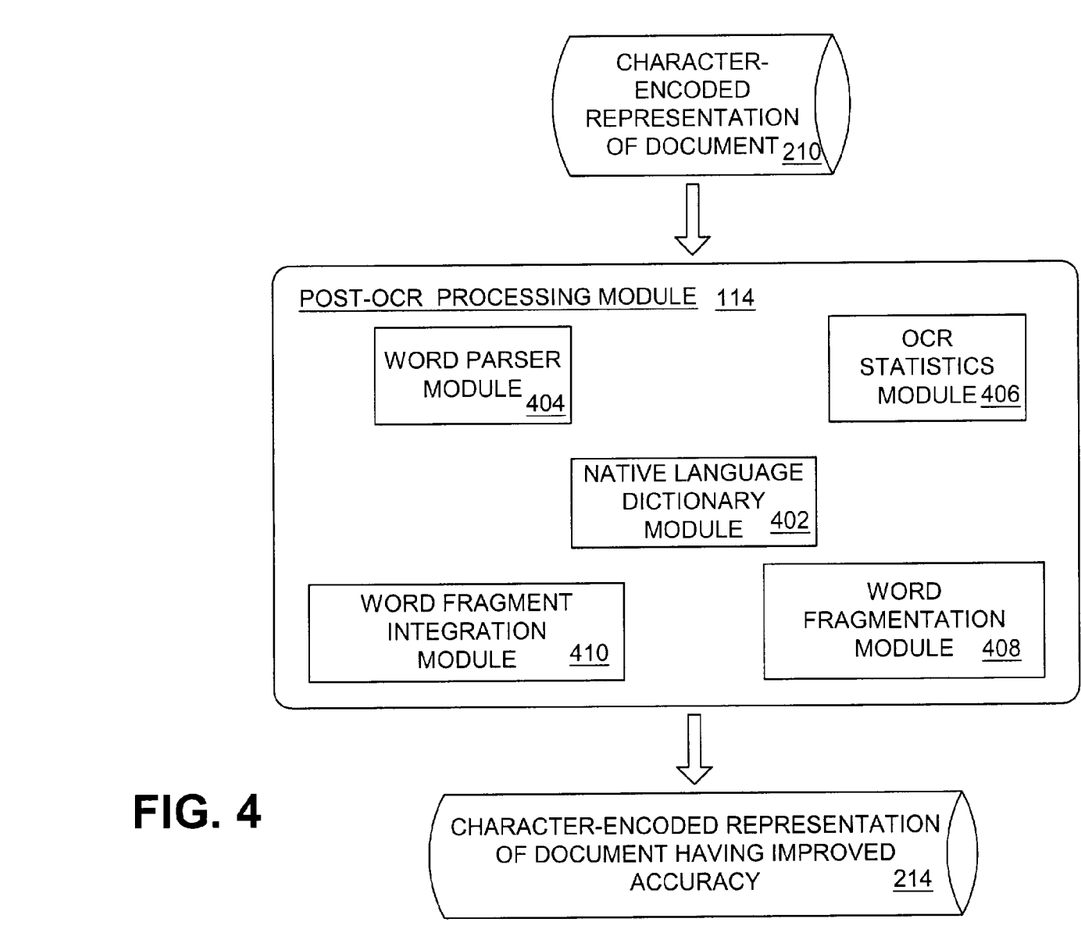
FIG. 4 is a flow chart illustrating the functionality, architecture, and/or operation of an embodiment of the post-OCR processing module of the system of FIG. 1.

In the embodiment illustrated in FIG. 4, post-OCR processing module 114 comprises a native language dictionary module 402, a word parser module 404, an OCR statistics module 406, a word fragmentation module 408, and a word fragment integration module 410. One of ordinary skill in the art will appreciate that native language dictionary module 402 may be configured in a variety of ways. For instance, native language dictionary module 402 may be configured to support any language. Furthermore, in certain embodiments, native language dictionary module 402 may be configured as an array of strings. Each string may comprise a separate line by using, for example, the digital representation of a new line or line feed (e.g., ASCII "10"). Thus, in this configuration, post-OCR processing module 114 may perform a maximum of N look-ups, where $2^N$ is greater than or equal to the number of words in the native language dictionary. For example, a native language dictionary comprising 65,636 entries would require no more than 16 look-ups ($2^{16}$=65,536).

Word parser module 404 may also be configured to parse the words in character-encoded representation 210 in a variety of ways. For example, many different rules may be applied to accomplish the word parsing. One of ordinary skill in the art will appreciate that any of the following, or other, rules may be used for parsing: (1) delimitation by strings of alphabetic characters; (2) delimitation by alphabetic characters plus common punctuation (e.g., the apostrophe character (') used for contractions) and punctuation mistakes (e.g., replacement of "i" with ",.", etc.); (3) delimitation as in (1) and (2) above with the allowance of whitespace and/or whitespace/continuation indicators (e.g., the hyphen character "-" between parts of a word on two lines), etc.

As described in more detail below, word fragmentation module 408 may be configured to fragment a glyph (at least one character) based on any of a variety of predefined rules. For example, word fragmentation module 408 may be configured to analyze a glyph to determine whether the glyph contains an embedded, or "word fragment." In certain embodiments, word fragmentation module 408 may be configured to extract word fragments of a certain length (e.g., six or more characters) embedded within a longer glyph. In addition to extracting word fragments from a glyph, word fragmentation module 408 may be configured to fragment a glyph into a set of smallest "primitive" parts. Word fragment integration module 410 is configured to combine two or more word fragments and/or glyphs based on predefined rules.

One of ordinary skill in the art will appreciate that OCR statistics module 406 may comprise any information related to the character recognition accuracy of OCR engine 112. By way of example, OCR statistics module 406 may comprise historical statistics about common glyph (at least one character) mistakes, substitutions, insertions, deletions, etc. Post-OCR processing module 114 may be configured in such a way that statistics related to OCR engine 112 may be downloaded from a communication network via a network interface device 118. One of ordinary skill in the art will further appreciate that optical character recognition system 110 may be configured as a feedback system such that, as OCR errors are identified, OCR statistics module 406 are updated. For instance, OCR errors may be identified by a user or, alternatively, by a process referred to as "ground-truthing." A "ground-truthed document" or "proofed document" includes documents for which the exact, correct spelling of all words is available. In this regard, a user may manually add OCR errors to the OCR statistics module 406 or OCR statistics module 406 may be updated based on a comparison to a proofed document.

It should be noted that post-OCR processing module 114 may be independently implemented of OCR engine 112. For instance, post-OCR processing module 114 may be used to process an electronic document that already exists and/or has not been processed via OCR engine 112. Post-OCR processing module 114 may be used to process an electronic document that has, for example, not been scanned and/or one that has been downloaded to be processed. Post-OCR processing module 114 may be used to process, for example, word processing files, hypertext markup language (HTML) files, or other electronic documents for which it is desirable to detect and/or correct residual OCR errors or any other spelling error regardless of the source. In this manner, a large, previously ground-truthed corpus can be used to generate a statistically-relevant list of OCR, hand-typed, HTML-based errors, or others. In this regard, it will be appreciated that post-OCR processing module 114 may be local and/or remote from OCR engine 112.

Figure 5:
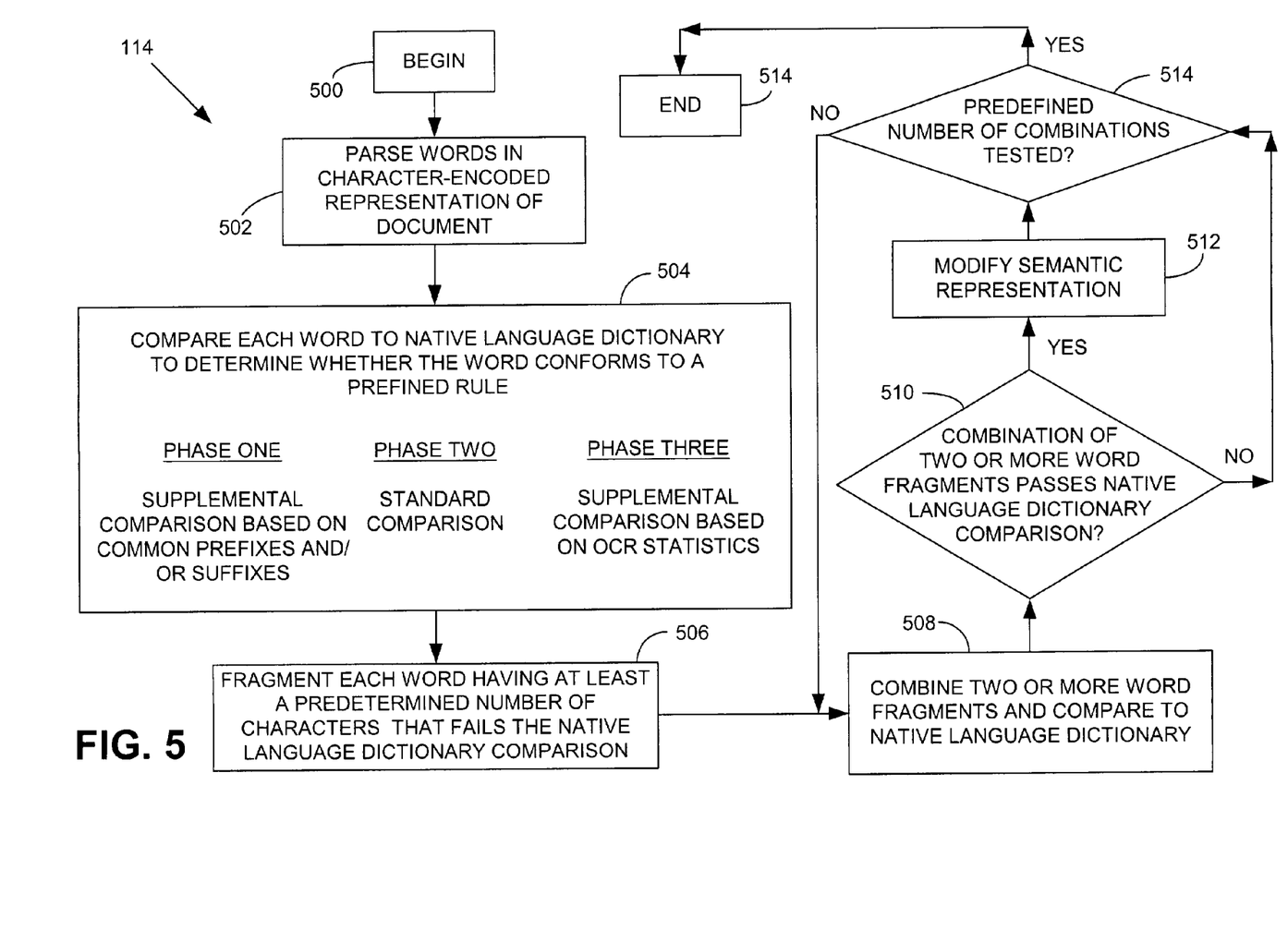
FIG. 5 is another flow chart illustrating the functionality, architecture, and/or operation of an embodiment of the post-OCR processing module of the system of FIG. 1.

FIG. 5 is a flow chart of an embodiment of post-OCR processing module 114. Post-OCR processing module 114 begins at block 500. Post-OCR processing module 114 may be initiated by a user via an I/O device 120. Post-OCR processing module 114 may also be automatically initiated by OCR engine 112, or other trigger.

Regardless of the manner in which it is initiated, at block 502, post-OCR processing module 114 parses the semantic representation 210 of the document into words.

At block 504, post-OCR processing module 114 compares each word that has been parsed to a native language dictionary to determine whether the word conforms to a predefined rule. For example, post-OCR processing module 114 may perform a standard comparison by merely comparing the parsed word to the native language dictionary to determine whether it matches one of the word entries contained in the native language dictionary. This type of comparison may be used to, for example, determine whether the word is properly spelled and/or has been properly recognized by OCR engine 112. Thus, post-OCR processing module 114 may be used to identify misspellings made in the original document 202, as well as misspellings resulting from character recognition errors made by OCR engine 112. In addition, "false positives" (i.e., situations in which words that are purposefully spelled such that they are not found in the native language dictionary) are "corrected" by post-OCR processing module 114 may be minimized by only attempting to find words stemming from common mistakes of glyphs, characters, punctuation, insertion and/or deletion of whitespace, etc. In this manner, purposefully-misspelled words that are not similar to dictionary look-ups or that cannot be translated into dictionary look-ups using common OCR mistakes may not be "corrected" by post-OCR processing module 114.

Post-OCR processing module 114 may perform more complex comparisons in order to extend the functionality of the native language dictionary. For instance, post-OCR processing module 114 may compare each word, in combination with various common suffixes and/or prefixes, to the native language dictionary to ensure that derivations of root words are considered. For example, optical character recognition system 110 may be configured with a relatively simple native language dictionary having a moderate number of word entries and which does not contain the word "indecipherable," but does, however, contain the word "decipher." Therefore, assuming the parsed word is in fact "indecipherable," post-OCR processing module 114 would not find an exact match in the native language dictionary. However, where common prefixes and/or suffixes are taken into consideration in the comparison (e.g., the prefix "in" and the suffix "able"), post-OCR processing module 114 may be able determine that the parsed word "indecipherable" has been spelled properly and/or that OCR engine 112 has properly recognized the characters.

Post-OCR processing module 114 may also make comparisons to the native language dictionary based on predetermined statistics related to the character recognition accuracy of OCR engine 112. Post-OCR processing module 114 may incorporate, for example, historical statistics about common glyph (at least one character) mistakes, substitutions, insertions, deletions, etc. By way of example, suppose OCR engine 112 has a statistically-determined tendency to recognize the glyph "rn" as the single character "m." Under these circumstances, OCR engine 112 may incorrectly identify the word "journal" as "joumal." Using the standard comparison and the supplemental comparison based on common prefixes and/or suffixes described above, post-OCR processing 114 would not be able to find a matching word entry in the native language dictionary. However, after taking into consideration OCR statistics, post-OCR processing module 114 may be able to determine that this erroneous substitution has been made by OCR engine 112.

For instance, after unsuccessfully finding "joumal" in the native language dictionary, post-OCR processing module 114 may analyze the characters in the word and the OCR statistics to determine whether there are any alternative words to be compared to the native language dictionary. Referring to the present example, post-OCR processing module 114 may recognize that the word contains the character "m" and that the OCR engine 112 has a statistically-determined tendency to recognize the glyph "rn" as the single character "m." Based on this information, post-OCR processing module 114 may compare the modified word to the native language dictionary. If the native language dictionary contains a word entry that matches the modified word, post-OCR processing module 114 may determine that the original word was improperly recognized by OCR engine 112. Post-OCR processing module 114 may then substitute the original word "joumal" (from character-encoded representation 210) with the modified word "joumal." As mentioned above, statistics on errors, other occurrences of "joumal" vs. "joumal" both within the document at hand and in other documents in a large corpus, can also be used. Post-processing module 114 may perform the word substitution within the original character-encoded representation 210, thereby producing a character-encoded representation 212 having improved character recognition accuracy. Alternatively, the character-encoded representation 212 having improved character recognition accuracy may be separately produced from the original character-encoded representation 210.

As stated above, if the standard comparison and the supplemental comparison based on common prefixes and/or suffixes do not provide a successful match, post-OCR processing module 114 may analyze the characters in the word and the OCR statistics to determine whether there are any alternative words to be compared to the native language dictionary. Thus, there may be multiple alternative words. In these circumstances, post-OCR processing module 114 may use the OCR statistics to prioritize the order in which alternative words are compared to the native language dictionary. For instance, alternative words having a higher probability of occurring may be compared to the native language dictionary before alternative words having a lower probability of occurring. By way of example, suppose OCR engine 112 has a statistically-determined tendency to recognize the glyph "rn" as the single character "m" and a lesser statistically-determined tendency to recognize the number "1" as the lower case letter "l". Post-OCR processing module 114 may be configured to first compare the alternative word "joumal" because there is a higher likelihood that OCR engine 112 would have made this error.

At block 506, post-OCR processing module 114 may fragment each word that fails at least one of the native language dictionary comparisons described above based on predefined word fragmentation rules. For example, post-OCR processing module 114 may analyze each word to determine whether the word is a compound word and/or whether the word contains other embedded words, or "word fragments." In certain embodiments, post-OCR processing module 114 may be configured to extract word fragments of a certain length (e.g., six or more characters) embedded within longer words. In addition to extracting word fragments from each word, post-OCR processing module 114 may be configured to break each misspelled word and/or each word fragment into a set of smallest "primitive" parts. This process of extracting word fragments and breaking word fragments into a set of smallest primitive parts may be referred to as "split and merge" or "fragment and combine." It gives an optimal set of relevant combinations of "primitives" (or better still, "atomics") for a given string of text to allow corrections of true misspellings. Thus, it reduces "false negatives," in which plausible corrections are missed without introducing too many "false positives" caused by overzealous searching for "close" spellings in the dictionary. In other words, post-OCR processing module 114 may only look for close spellings when the mistake substitution, omission, replacement, insertions, etc. is typical for the given OCR engine.

At block 508, post-OCR processing module 114 may combine two or more word fragments and/or misspelled words to the native language dictionary. For example, groups of originally-misspelled words and/or word fragments may be combined together by considering words and/or word fragments before and after each word and/or word fragment. As illustrated by blocks 510, 512, and 514, post-OCR processing module 114 may perform an iterative process of: (1) combining two or more misspelled words and/or word fragments; (2) comparing the combined word to the native language dictionary as described above; and (3) modifying the semantic representation 210 of the document with the combined word, if the combined word matches one of the word entries in the native language dictionary. As stated above, post-processing module 114 may substitute the original word with the combined word within the original semantic representation 210, thereby producing a semantic representation 212 having improved character recognition accuracy. Alternatively, the semantic representation 212 having improved character recognition accuracy may be produced separately from the original semantic representation 210.

Furthermore, the iterative process may be driven by any of a number of predefined rules. For example, in certain embodiments, post-OCR processing module 114 may perform a predefined number of iterations. In alternative embodiments, post-OCR processing module 114 may be configured to combine only a certain number of consecutive misspelled words and/or word fragments. Post-OCR processing module 114 ends at block 514.

Figure 6:
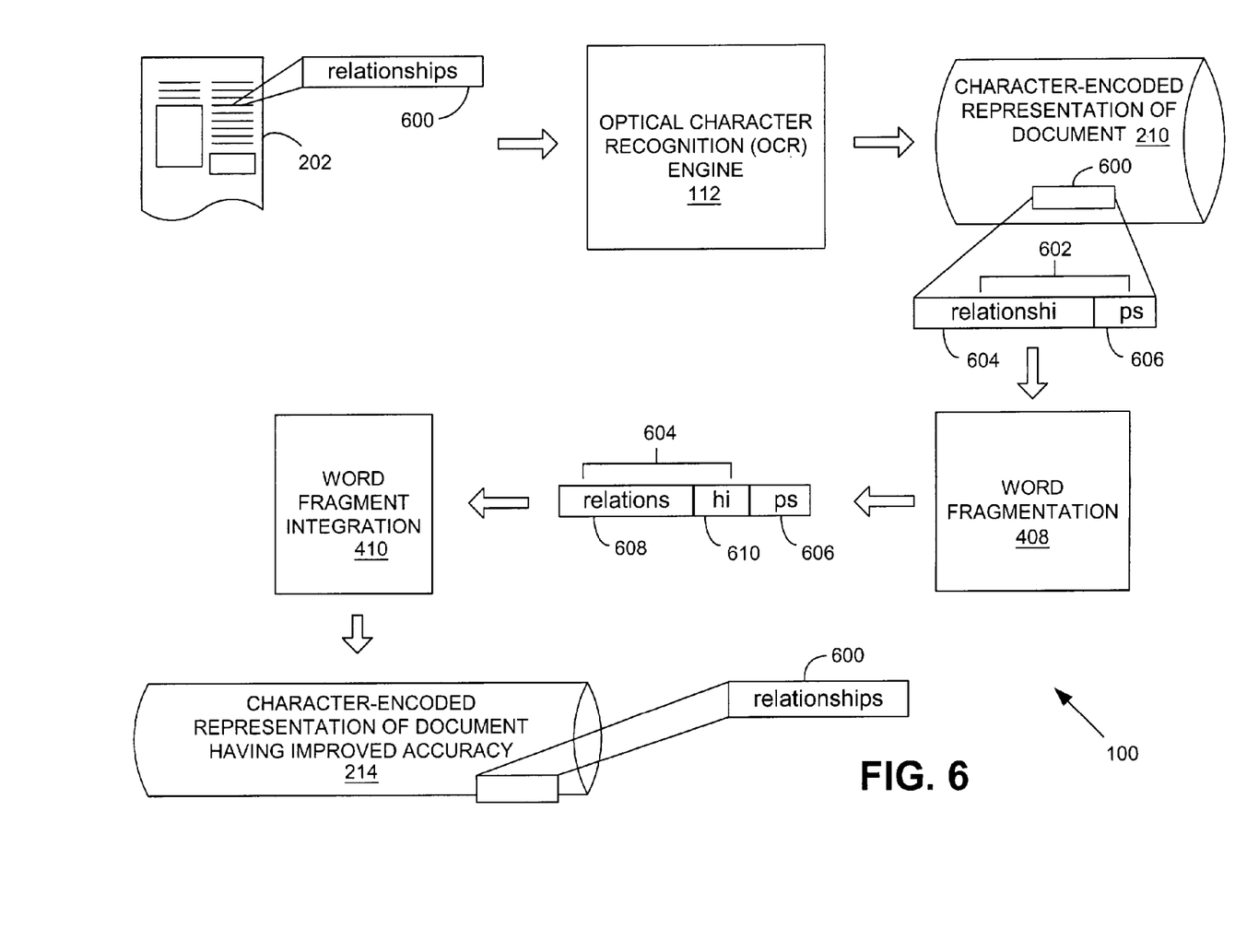
FIG. 6 is a flow chart illustrating an embodiment of the word fragmentation module and word fragment integration modules of FIG. 4 performing post-OCR processing on a sample portion of text from a document.

In order to further illustrate the concepts of the present invention, FIG. 6 illustrates an embodiment of post-OCR processing module 112 performing post-OCR processing on a sample portion of text from a document 202. As illustrated in FIG. 6, a document 202 may contain a text portion 600. For purposes of this example, text portion 600 comprises the single word "relationships." As described above, OCR system 100 may capture text portion 600 as part of a document image 300 by scanning the document 202. OCR engine 112 may convert document image 300 into a semantic representation 210, which contains a glyph 602 corresponding to the converted text portion 600, via a variety of character recognition processes. Due to inaccuracies associated with the character recognition process, OCR engine 112 may improperly recognize at least one character in glyph 602. For example, OCR engine 112 may improperly recognize additional white space between the "i" and "p" characters, thereby generating two separate glyphs 604 and 606: glyph 604 comprising the characters "relationshi" and glyph 606 comprising the characters "ps."

Post-OCR processing module 114 may parse glyphs 604 and 606 from the semantic representation 210 and then compare glyphs 604 and 606 to a native language dictionary as described above with respect to FIG. 5. If OCR engine 112 had properly recognized glyph 602, post-OCR processing module 114 may determine that glyph 606 was properly spelled. For example, post-OCR processing module 112 could verify glyph 602 was properly spelled using the standard comparison described above, if the native language dictionary contained the word "relationships." Post-OCR processing module 114 could also verify glyph 602 was spelled properly using the supplemental comparison based on common prefixes and/or suffixes described above, if the native language dictionary contained the word "relationship" and post-OCR processing module 112 was configured to account for the suffix "s." However, as in this example, where glyphs 604 and 606 cannot be verified by the native language dictionary comparison, further post-OCR processing may occur.

Glyphs 604 and 606 may be further processed by word fragmentation module 408. Word fragmentation module 408 may fragment glyphs 604 and 606 as described above. For example, word fragmentation module 408 may analyze glyphs 604 and 606 to determine whether the glyph comprises a compound word and/or whether the word contains other embedded words, or "word fragments." In certain embodiments, word fragmentation module 408 may be configured to extract word fragments of a certain length (e.g., six or more characters) embedded within glyphs 604 and 606. In addition to extracting word fragments, word fragmentation module 408 may be configured to break each glyph into a set of smallest "atomic" parts. As illustrated in FIG. 6, based on these predefined fragmentation rules, word fragmentation module 408 may fragment glyph 604 into fragments 608 and 610: fragment 608 comprising the word "relations" and fragment 610 comprising the word "hi."

Fragments 608 and 610 and glyph 606 may then be processed by word fragment integration module 410. As described above, word fragment integration module 410 may be configured to combine two or more word fragments and/or misspelled words to the native language dictionary. For example, groups of originally-misspelled words and/or word fragments may be combined together by considering words and/or word fragments before and after each word and/or word fragment. As illustrated in FIG. 6, word fragment integration module 410 may combine fragments 608 and 610 and glyph 606 (thereby producing the word "relationships") and compare the combination to the native language dictionary. Post-OCR processing module 112 may verify that the combination produces a valid word (via the standard comparison described above), if the native language dictionary contains the word "relationships." Post-OCR processing module 114 may also verify that the combination produces a valid word (via the supplemental comparison based on common prefixes and/or suffixes described above), if the native language dictionary contains the word "relationship" and post-OCR processing module 112 is configured to account for the suffix "s. Where post-OCR processing module 112 verifies that the combination produces a valid word, post-OCR processing module 114 may substitute the glyph 602 within character-encoded representation 210 with the combination, thereby producing a character-encoded representation 212 having improved character recognition accuracy.

Given the description above, one of ordinary skill in the art will appreciate that OCR system 110 may comprise multiple OCR engines 112 integrated with post-OCR processing module 114. In this manner, post-OCR processing module 114 may process the character-encoded representation 210 from multiple OCR engines and produce corresponding character-encoded representations 212 having improved character recognition accuracy. Thus, OCR system 110 may provide comparative data for the OCR engines 112. Furthermore, the character-encoded representations 212 corresponding to the OCR engines 112 may be used to obtain a better overall output. For example, post-OCR processing module 114 may be configured to determine the OCR engine 112 having the best overall accuracy (e.g., based on the number of words not recognized during the native language dictionary comparison). Post-OCR processing module 112 may be configured to select the corresponding character-encoded representation 212 as the most accurate output. Post-OCR processing module 114 may also be configured to combine character-encoded representations 212 to produce a more comprehensive output. Post-OCR processing engine 114 may be configured to combine character-encoded representations 212 based on the OCR statistics for each OCR engine 112. Post-OCR processing module 114 may also be configured to incorporate statistics for each OCR engine 112, such as how well each OCR engine 112 performs on particular types of text (e.g., delimited font size, type, family, attribute, etc.)

It should be noted that additional techniques for augmenting the OCR statistics may be employed. For instance, the document itself can provide increasingly weighted statistics for a putative correction based on the number of occurrences of the "corrected" spelling elsewhere in the document. For example, should the statistics for "relationships" be just below those of "relations hi ps", but "relationships" (or its roots, "relation," "relations", "relationship," with lesser but nonzero effect on the weighting, also) occurs in several other places in the same document, this can lead to accepting "relationships" over "relations hi ps" even if the single instance does not do SQ. These "occurrence weighting" statistics may be used by post-OCR processing module 114.

It should be appreciated that OCR engine 112 and post-OCR processing module 114 may be stored in the same local memory 104, as illustrated in FIG. 1. In alternative embodiments, post-OCR processing module 114 may be located remote from OCR engine 112 in a separate memory. It should be further appreciated that various aspects of post-OCR processing module 114 may be located in a memory separate from a memory containing the other aspects.

Therefore, having thus described the invention, at least the following is claimed:

1. A method for processing a text-based electronic document, the method comprising:
   performing optical character recognition processing on the text-based electronic document by comparing at least one word in the text-based electronic document to a native language dictionary to determine whether the at least one word conforms to a predefined rule;
   if the at least one word does not conform to the predefined rule:
      fragmenting the at least one word into word fragments;
      combining at least two consecutive word fragments of the at least one word to form a combination of the word fragments; and comparing the combination of the word fragments to the native language dictionary such that, if the combination of the word fragments conforms to the predefined rule, the combination is used in the text-based electronic document; and
      determining whether the at least one word matches a combination of: a word entry in the native language dictionary; and at least one of a common prefix and a common suffix such that, if the combination conforms to the predefined rule, the combination is used in the text-based electronic document.

2. The method of claim 1, further comprising generating the text-based electronic document with at least one optical character recognition system.

3. The method of claim 2, wherein the comparing the at least one word comprises:
   modifying the at least one word based on predetermined statistics related to the character recognition accuracy of the optical character recognition system; and
   determining whether the at least one word as modified matches a word entry in the native language dictionary.

4. The method of claim 3, wherein the modifying involves modifying the at least one word based on predetermined statistics related to at least one of the following: a glyph mistake, a glyph substitution, a glyph insertion, and a glyph deletion.

5. The method of claim 3, wherein the modifying involves modifying the at least one word based on predetermined statistics, which define two or more modified words.

6. The method of claim 1, further comprising modifying the text-based electronic document with the combination of the word fragments based on the comparison to the native language dictionary.

7. The method of claim 1, further comprising:
parsing the text-based electronic document into words.

8. The method of claim 1, wherein the comparing the at least one word comprises determining whether the at least one word matches a word entry in the native language dictionary.

9. The method of claim 1, further comprising:
scanning a document;
converting the document into a document image; and
generating the text-based electronic document with the document image.

10. The method of claim 9, wherein the generating the text-based electronic document comprises:
extracting a text portion from the document image; and
recognizing characters in the text portion.

11. A system for processing a text-based electronic document, the system comprising:
logic configured to perform optical character recognition processing, the logic being operative to:
compare at least one word in the text-based electronic document to a native language dictionary to determine whether the at least one word conforms to a predefined rule:
fragment the at least one word into word fragments if the at least one word does not conform to the predefined rule; combine at least two consecutive word fragments of the at least one word to form a combination of the word fragments; and compare the combination of the word fragments to the native language dictionary such that, if the combination of the word fragments conforms to the predefined rule, the combination is used in the text-based electronic document; and
determine whether the at least one word matches a combination of: a word entry in the native language dictionary: and at least one of a common prefix and a common suffix if the at least one word does not conform to the predefined rule such that, if the combination conforms to the predefined rule, the combination is used in the text-based electronic document.

12. The system of claim 11, further comprising a memory containing the native language dictionary.

13. The system of claim 11, wherein the text-based electronic document comprises a text file.

14. The system of claim 11, wherein the logic is further configured to modify the text-based electronic document with the combination of the word fragments based on the comparing of the at least one word to the native language dictionary.

15. The system of claim 11, wherein the logic is further configured to:
parse a text representation of the text-based electronic document into words.

16. The system of claim 11, wherein the logic configured to compare the at least one word is further configured to determine whether the at least one word matches a word entry in the native language dictionary.

17. The system of claim 11, wherein the logic is further configured to:
modify the at least one word based on predetermined statistics related to the character recognition accuracy of the optical character recognition system; and
determine whether the at least one word as modified matches a word entry in the native language dictionary.

18. The system of claim 17, wherein the predetermined statistics related to the character recognition accuracy of the optical character recognition system are related to at least one of the following: a glyph mistake, a glyph substitution, a glyph insertion, and a glyph deletion.

19. The system of claim 17, wherein the predetermined statistics define at least two modified words and wherein the logic configured to determine whether the at least one word as modified matches a word entry in the native language dictionary is prioritized based on the predetermined statistics.

20. The system of claim 11, further comprising an optical character recognition system.

21. The system of claim 20, wherein the optical character recognition system comprises:
a scanning device configured to convert a document into a document image; and
an OCR engine configured to generate the text-based electronic document by extracting a text portion from the document image and recognizing characters in the text portion.

22. A system for processing a text-based electronic document, the system comprising:
a means for comparing, during optical character recognition processing, at least one word in the text-based electronic document to a native language dictionary to determine whether the at least one word conforms to a predefined rule;
a word fragmentation means for fragmenting the at least one word into word fragments if the at least one word does not conform to the predefined rule;
a word fragment integration means for combining at least two consecutive word fragments of the at least one word to form a combination of the word fragments;
a means for comparing the combination of the word fragments to the native language dictionary such that, if the combination of the word fragments conforms to the predefined rule, the combination is used in the text-based electronic document; and
a means for determining whether the at least one word matches a combination of: a word entry in the native language dictionary; and at least one of a common prefix and a common suffix such that, if the combination conforms to the predefined rule, the combination is used in the text-based electronic document.

23. The system of claim 22, further comprising a means for storing the native language dictionary.

24. The system of claim 22, further comprising:
a word parser means for parsing the text representation of the text-based electronic document into words.

25. The system of claim 22, further comprising:
a means for scanning a document into a document image; and
a character recognition means for generating the text-based electronic document by extracting a text portion from the document image and recognizing characters in the text portion.

* * * * *

UNITED STATES PATENT AND TRADEMARK OFFICE
CERTIFICATE OF CORRECTION

PATENT NO. : 7,106,905 B2  Page 1 of 1
APPLICATION NO. : 10/227076
DATED : September 12, 2006
INVENTOR(S) : Steven J. Simske It is certified that error appears in the above-identified patent and that said Letters Patent is hereby corrected as shown below:

In column 8, line 52, after "word" delete ""joumal"" and insert -- "journal" --, therefor.

In column 9, line 10, delete ""joumal."" and insert -- "journal." --, therefor.

In column 9, line 12, after "of" delete ""joumal"" and insert -- "journal" --, therefor.

In column 9, line 42, delete ""joumal"" and insert -- "journal" --, therefor.

In column 12, line 19, delete "SQ" and insert -- so --, therefor.

In column 13, line 45, in Claim 11, delete "dictionary:" and insert -- dictionary; --, therefor.

Signed and Sealed this

Twelfth Day of May, 2009

JOHN DOLL
*Acting Director of the United States Patent and Trademark Office*